United States Patent
Koo et al.

(10) Patent No.: US 10,430,297 B2
(45) Date of Patent: Oct. 1, 2019

(54) DATA STORAGE DEVICE AND OPERATING METHOD THEREOF

(71) Applicant: SK hynix Inc., Gyeonggi-do (KR)

(72) Inventors: Duck Hoi Koo, Gyeonggi-do (KR); Yong Tae Kim, Seoul (KR); Soong Sun Shin, Gyeonggi-do (KR); Cheon Ok Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 102 days.

(21) Appl. No.: 15/830,901

(22) Filed: Dec. 4, 2017

(65) Prior Publication Data

US 2018/0341557 A1 Nov. 29, 2018

(30) Foreign Application Priority Data

May 29, 2017 (KR) .................. 10-2017-0066072

(51) Int. Cl.
*G06F 11/00* (2006.01)
*G06F 11/14* (2006.01)
*G06F 3/06* (2006.01)
*G06F 12/02* (2006.01)

(52) U.S. Cl.
CPC .......... *G06F 11/1469* (2013.01); *G06F 3/065* (2013.01); *G06F 3/0616* (2013.01); *G06F 3/0619* (2013.01); *G06F 3/0679* (2013.01); *G06F 11/1451* (2013.01); *G06F 12/0253* (2013.01); *G06F 2201/805* (2013.01); *G06F 2201/82* (2013.01); *G06F 2212/7205* (2013.01)

(58) Field of Classification Search
CPC .................. G06F 11/1402; G06F 11/1469
USPC ......................................... 714/19
See application file for complete search history.

(56) References Cited

U.S. PATENT DOCUMENTS

| 2012/0173796 A1* | 7/2012 | Shen ............... G06F 12/0246 711/103 |
| 2016/0216908 A1* | 7/2016 | Kim ..................... G06F 3/0652 |
| 2016/0283369 A1* | 9/2016 | Hada ................... G06F 12/0253 |

FOREIGN PATENT DOCUMENTS

KR 101301828 8/2013

* cited by examiner

*Primary Examiner* — Sarai E Butler
(74) *Attorney, Agent, or Firm* — IP & T Group LLP (57) ABSTRACT

A method for operating a data storage device which includes a nonvolatile memory device including a plurality of memory blocks, includes generating a valid page count table including the number of valid pages of each of closed blocks among the plurality of memory blocks in which data are written in all pages thereof and the number of valid pages of at least one open block among the plurality of memory blocks in which data is written in a part of pages thereof; generating a valid page scan table including a scan pointer for scanning the number of valid pages of the open block; and backing up the valid page count table and the valid page scan table in a meta block among the plurality of memory blocks.

18 Claims, 12 Drawing Sheets

DATA STORAGE DEVICE AND OPERATING METHOD THEREOF

CROSS-REFERENCES TO RELATED APPLICATION

The present application claims priority under 35 U.S.C. § 119(a) to Korean application number 10-2017-0066072, filed on May 29, 2017, in the Korean Intellectual Property Office, which is Incorporated herein by reference in its entirety.

BACKGROUND

1. Technical Field

Various embodiments generally relate to a data storage device Including a nonvolatile memory device as a storage medium.

2. Related Art

Recently, the paradigm for the computer environment has been changed into ubiquitous computing so that computer systems can be used anytime and anywhere. Due to this fact, the use of portable electronic devices such as mobile phones, digital cameras, and notebook computers has rapidly increased. In general, portable electronic devices use a data storage device which uses a memory device. A data storage device is used to store data to be used in a portable electronic device.

A data storage device using a memory device has excellent stability and durability because it does not include a mechanical driving unit. Also, a data storage device using a memory device is advantageous in that it may access data faster and consume less power. Non-limiting examples of a data storage devices having such advantages include a universal serial bus (USB) memory device, memory cards having various interfaces, a universal flash storage (UFS) device, and a solid state drive (SSD).

SUMMARY

Various embodiments are directed to a data storage device and an operating method thereof, capable of efficiently rebuilding metadata in a recovery operation from a power failure state.

In an embodiment, a method for operating a data storage device which includes a nonvolatile memory device including a plurality of memory blocks, includes generating a valid page count table including the number of valid pages of each of closed blocks among the plurality of memory blocks in which data are written in all pages thereof and the number of valid pages of at least one open block among the plurality of memory blocks in which data is written in a part of pages thereof; generating a valid page scan table including a scan pointer for scanning the number of valid pages of the open block; and backing up the valid page count table and the valid page scan table in a meta block among the plurality of memory blocks.

In an embodiment, a data storage device may include: a nonvolatile memory device including empty blocks which are not stored with data, closed blocks in which data are stored in all pages, at least one open block in which data is stored in only a part of pages, and a meta block; and a controller suitable for: generating a valid page count table based on the number of valid pages of the respective closed blocks and the number of valid pages of the open blocks; generating a valid page scan table based on a scan pointer which indicates an address of an empty page of the open block; and backing up the valid page count table and the valid page scan table in the meta block.

The data storage device in accordance with the present invention can efficiently rebuild metadata in a recovery operation from a power failure state.

DETAILED DESCRIPTION

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in sufficient detail so that a person skilled in the art to which the present invention pertains can easily practice the technical concept of the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or Intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a data storage device and an operating method thereof will be described below with reference to the accompanying drawings through various examples of embodiments.

Figure 1:
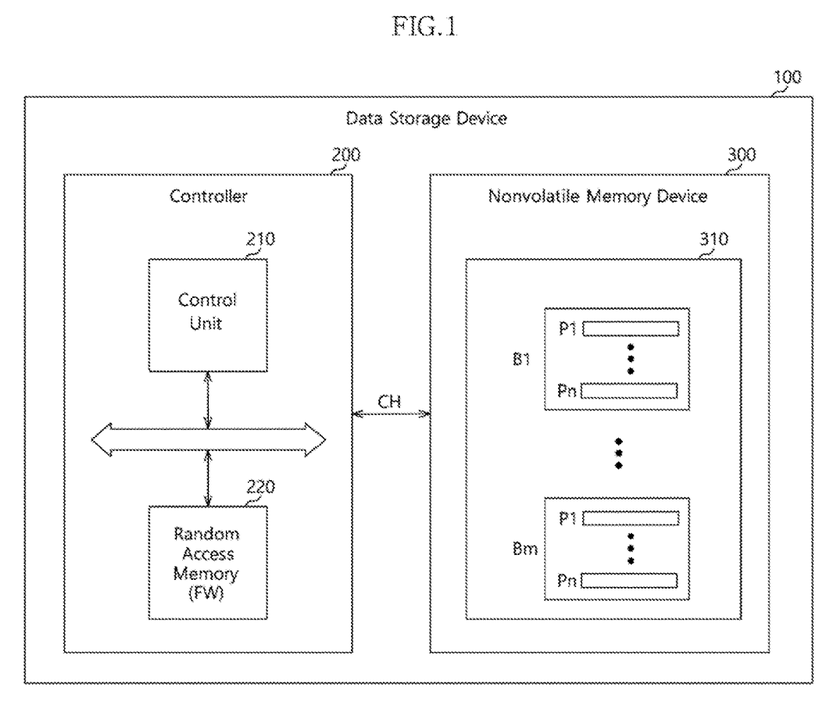
FIG. 1 is a block diagram illustrating a data storage device in accordance with an embodiment of the present invention.
Figure 2:
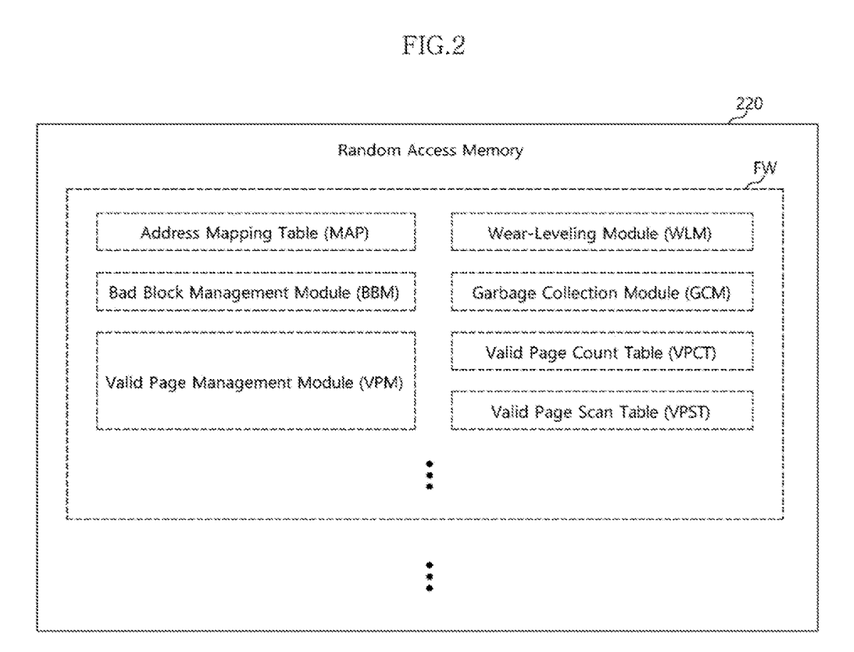
FIG. 2 is a diagram illustrating a firmware which is driven by a control unit in accordance with an embodiment of the present invention.

FIG. 1 is a block diagram illustrating a data storage device 100 in accordance with an embodiment of the present invention. FIG. 2 is a diagram illustrating a firmware which is driven by a control unit of the data storage device 100 in accordance with an embodiment of the present invention.

The data storage device 100 may store data to be accessed by a host device (not shown) such as a mobile phone, an MP3 player, a laptop computer, a desktop computer, a game player, a television (TV), an in-vehicle infotainment system, and so forth. The data storage device 100 may be referred to as a memory system.

The data storage device 100 may be manufactured as any one of various kinds of storage devices according to a host interface meaning a transmission protocol with respect to the host device. For example, the data storage device 100 may be configured as any one of various kinds of storage devices such as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-e) card type storage device, a compact flash (CF) card, a smart media card, a memory stick, and so forth.

The data storage device 100 may be manufactured as any one among various kinds of package types, such as, for example, a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 100 may include a controller 200 and a nonvolatile memory device 300. The controller 200 may include a control unit 210 and a random access memory 220. The nonvolatile memory device 300 may include a memory cell region 310 including a plurality of memory blocks B1 to Bm. Each of the memory blocks B1 to Bm may include a plurality of pages P1 to Pn.

The control unit 210 may be configured by a micro control unit (MCU) or a central processing unit (CPU). The control unit 210 may process a request which is received from the host device. In order to process the request, the control unit 210 may drive an instruction or algorithm of a code type, that is, a firmware FW, loaded in the random access memory 220, and may control internal function blocks or the nonvolatile memory device 300.

The random access memory 220 may be configured by a random access memory such as a dynamic random access memory (DRAM) or a static random access memory (SRAM). The random access memory 220 may store the firmware FW which is to be driven by the control unit 210. Also, the random access memory 220 may store data necessary for driving the firmware FW, for example, metadata. That is, the random access memory 220 may operate as the working memory of the control unit 210.

Referring to FIG. 2, the firmware FW loaded in the random access memory 220 may be configured in modules for performing various functions and metadata necessary for driving the modules. For example, the firmware FW may include an address mapping table MAP, a wear-leveling module WLM, a bad block management module BBM, a garbage collection module GCM, a valid page management module VPM, a valid page count table VPCT, and a valid page scan table VPST. The configuration of the firmware FW is not limited to the above-described modules, and may further Include modules such as an interleaving module for operating the nonvolatile memory device 300 in parallel, a power failure management module for preparing for an unexpected power-off, and so forth.

The host device which accesses the data storage device 100 may provide a logical address to the data storage device 100. The control unit 210 may translate the logical address into a physical address of the nonvolatile memory device 300, and process a request of the host device by referring to the translated physical address. For performing the address translation operation, the address mapping table MAP which includes address translation data, may be generated and managed.

The wear-leveling module WLM may manage wear levels of memory blocks B1 to Bm of the nonvolatile memory device 300. Memory cells of the nonvolatile memory device 300 may be aged by an erase operation and/or a write operation. Aged memory cells, that is, worn-out memory cells may cause falls (for example, physical defects). The wear-leveling module WLM may manage the erase-write counts of the respective memory blocks B1 to Bm to be more evenly leveled throughout the memory cell region 310 of the nonvolatile memory device 300, so as to prevent a certain memory block from being worn out faster than the other memory blocks.

The bad block management module BBM may manage a memory block in which a fail has occurred, among the memory blocks B1 to Bm of the nonvolatile memory device 300. As described above, a fail (for example, a physical defect) may occur in a worn-out memory cell. Data stored in a failed memory cell may not be read out normally. Moreover, data may not be stored normally in a failed memory cell. The bad block management module BBM may manage a memory block including a failed memory cell, in such a way as not to be used.

The nonvolatile memory device 300 does not support overwrite of data due to a structural characteristic thereof. Therefore, in order to rewrite data in a memory cell already written with data, an erase operation should be first performed to erase the already written data. Typically, the erase operation of the nonvolatile memory device 300 requires a lengthy time. For this reason, the control unit 210 stores data which are to be written in a memory cell already written with data, in a different, already erased memory cell. By this operation of the control unit 210, valid data and invalid data are mixed in the memory cell region 310 of the nonvolatile memory device 300. As the occasion demands, the garbage collection module GCM may perform a series of operations of collecting valid data in one place and erasing invalid data, that is, a garbage collection operation. The garbage collection operation may also be referred to as a merge operation.

The valid page management module VPM, the valid page count table VPCT and the valid page scan table VPST will be described below in detail.

Referring back to FIG. 1, the nonvolatile memory device 300 of the data storage device 100 may be coupled with the controller 200 through a channel CH which includes at least one signal line capable of transmitting a command, an address, control signals and data. The nonvolatile memory device 300 may be used as the storage medium of the data storage device 100.

The nonvolatile memory device 300 may be configured by any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RERAM) using a transition metal oxide.

The nonvolatile memory device 300 may include the memory cell region 310. The memory cell region 310 may include the plurality of memory blocks B1 to Bm, and each of the memory blocks B1 to Bm may include a plurality of pages P1 to Pn. From an operational viewpoint or a physical (or structural) viewpoint, the memory cells included in the memory cell region 310 may be configured into a hierarchical memory cell set or memory cell unit. For example, memory cells which are coupled to the same word line and are to be read and written (or programmed) simultaneously may be configured as a page P. In the following descriptions, for the sake of convenience in explanation, memory cells configured as a page P will be referred to as a "page." Also, memory cells to be erased simultaneously may be configured as a memory block B.

Figure 3:
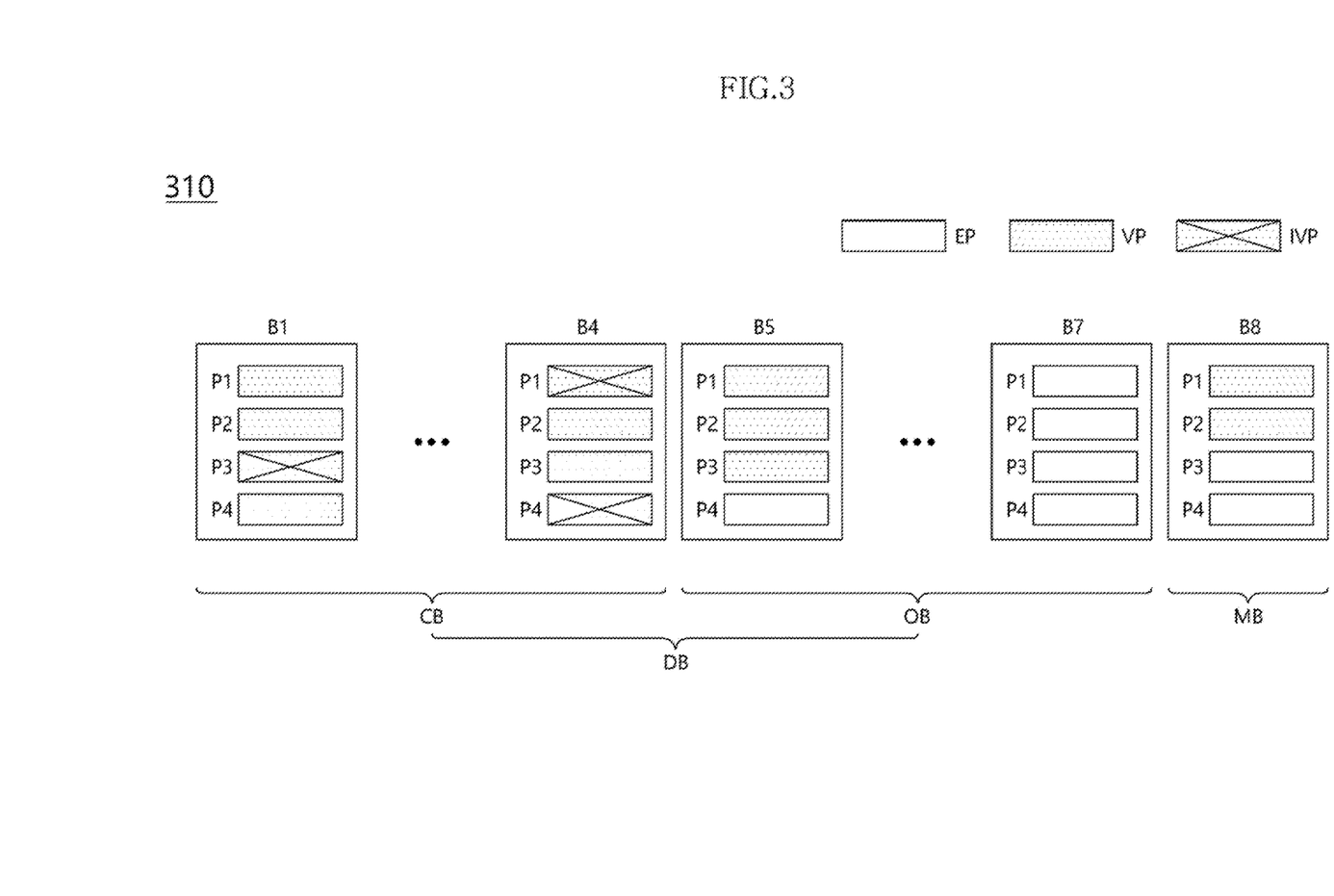
FIG. 3 is a diagram illustrating the configuration of memory blocks in accordance with an embodiment of the present invention.

FIG. 3 is a diagram illustrating an exemplary configuration of memory blocks in accordance with an embodiment of the present invention. For the sake of convenience in explanation, memory blocks B1 to B8 of the memory cell region 310 in FIG. 1, each including four pages P1 to P4 are exemplified hereunder. Also, as an example, the memory blocks B1 to B7 may be used as data blocks DB and memory block B8 may be used as a meta block MB by the control unit 210. The numbers of data blocks DB and meta blocks MB and the number of pages P allocated to each memory block may be changed variously.

The data blocks DB may be defined as memory blocks which are used in storing user data. The user data may mean data generated and used in a software layer of the host device which is controlled by a user, such as application program codes and files. The data blocks DB may be divided into closed blocks CB and open blocks OB.

The closed blocks CB may be defined as memory blocks which are fully written with data. In other words, the closed blocks CB may mean memory blocks in which data are written in all of their pages. Each of the closed blocks CB may include a page in which valid data is stored (hereinafter, referred to as a valid page VP) and a page in which invalid data is stored (hereinafter, referred to as an Invalid page IVP). For example, in the embodiment of FIG. 3, the closed blocks CB include memory blocks B1 and B4. The memory block B1 includes pages P1, P2 and P4 which are valid pages VP, and a page P3 which is an invalid page IVP. The memory block B4 includes pages P2 and P3 which are valid pages VP, and pages P1 and P4 which are invalid pages IVP.

The open blocks OB may be defined as memory blocks which are not fully written or in which writing is in progress. In other words, the open blocks OB may mean memory blocks in which data are written in only some of their pages. Each of the open blocks OB may include a valid page VP and an empty page EP. The open blocks OB may also be referred to as log blocks or buffer blocks. For example, the open blocks OB include memory blocks B5 and B7. The memory block B5 includes pages P1, P2 and P3 which are valid pages VP, and a page P4 which is an empty page EP. The memory block B7 is an empty block and, hence, has pages P1 to P4 which are empty pages EP.

The meta block MB may be defined as a memory block which is used in storing metadata. The metadata may mean data generated and used in the controller 200, such as the firmware FW, the address mapping table MAP, the valid page count table VPCT and the valid page scan table VPST. For example, in the embodiment of FIG. 3, memory block B8 is the meta block MB. The memory block B8 includes pages P1 and P2 which are valid page VP, and pages P3 and P4 which are empty pages EP.

Figure 4:
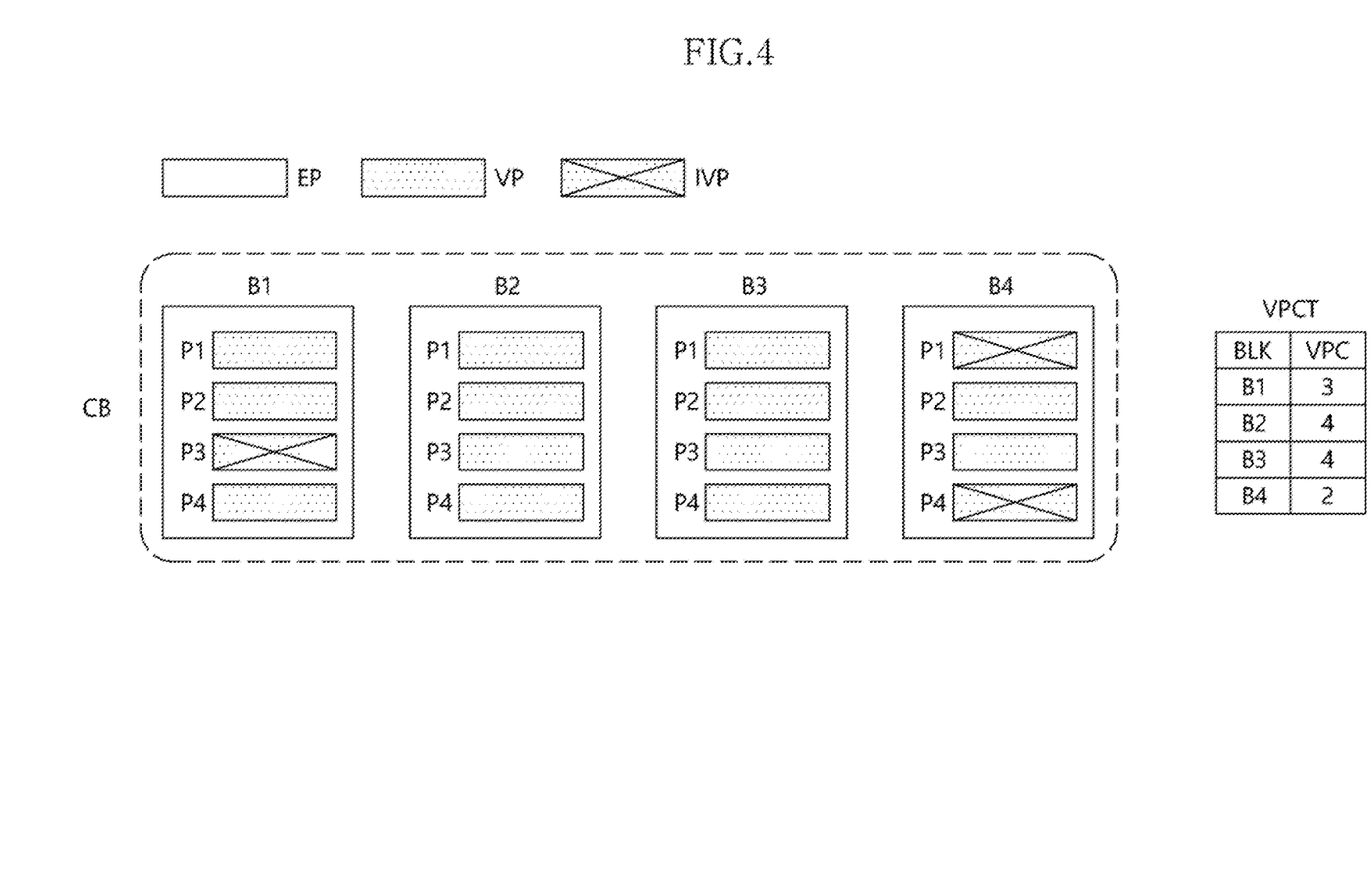
FIG. 4 is a diagram illustrating a valid page count table in accordance with an embodiment of the present invention.

FIG. 4 is a diagram illustrating an exemplary valid page count table in accordance with an embodiment of the present invention. The valid page count table VPCT may be managed by the valid page management module VPM of FIG. 2 and may be defined as a table including valid page count information VPC for the respective memory blocks BLK. For example, the valid page count information as shown in FIG. 4 may be the number of valid pages of the respective memory blocks. The valid page count table VPCT may include.

The valid page management module VPM may perform a valid page scan operation for each of the memory blocks, and generate the valid page count table VPCT. If the number of valid pages of each of the respective memory blocks is changed, the valid page management module VPM may reflect the changed number of valid pages on the valid page count table VPCT. Namely, if the number of valid pages of each of the respective memory blocks is changed, the valid page management module VPM may update the valid page count table VPCT. When the data storage device 100 of FIG. 1 is powered off or a metadata backup event occurs, the valid page management module VPM may back up the valid page count table VPCT loaded in the random access memory 220, in the meta block MB.

The valid page count table VPCT generated according to the valid pages of closed blocks B1 to B4 at a specific point of time is illustrated in FIG. 4. Referring to FIG. 4, because the first memory block B1 includes three valid pages P1, P2 and P4, the valid page count VPC of the first memory block B1 is "3." Because the second memory block B2 includes four valid pages P1 to P4, the valid page count VPC of the second memory block B2 is "4." Because the third memory block B3 includes four valid pages P1 to P4, the valid page count VPC of the third memory block B3 is "4." Because the fourth memory block B4 includes two valid pages P2 and P3, the valid page count VPC of the fourth memory block B4 is "2."

Figure 5:
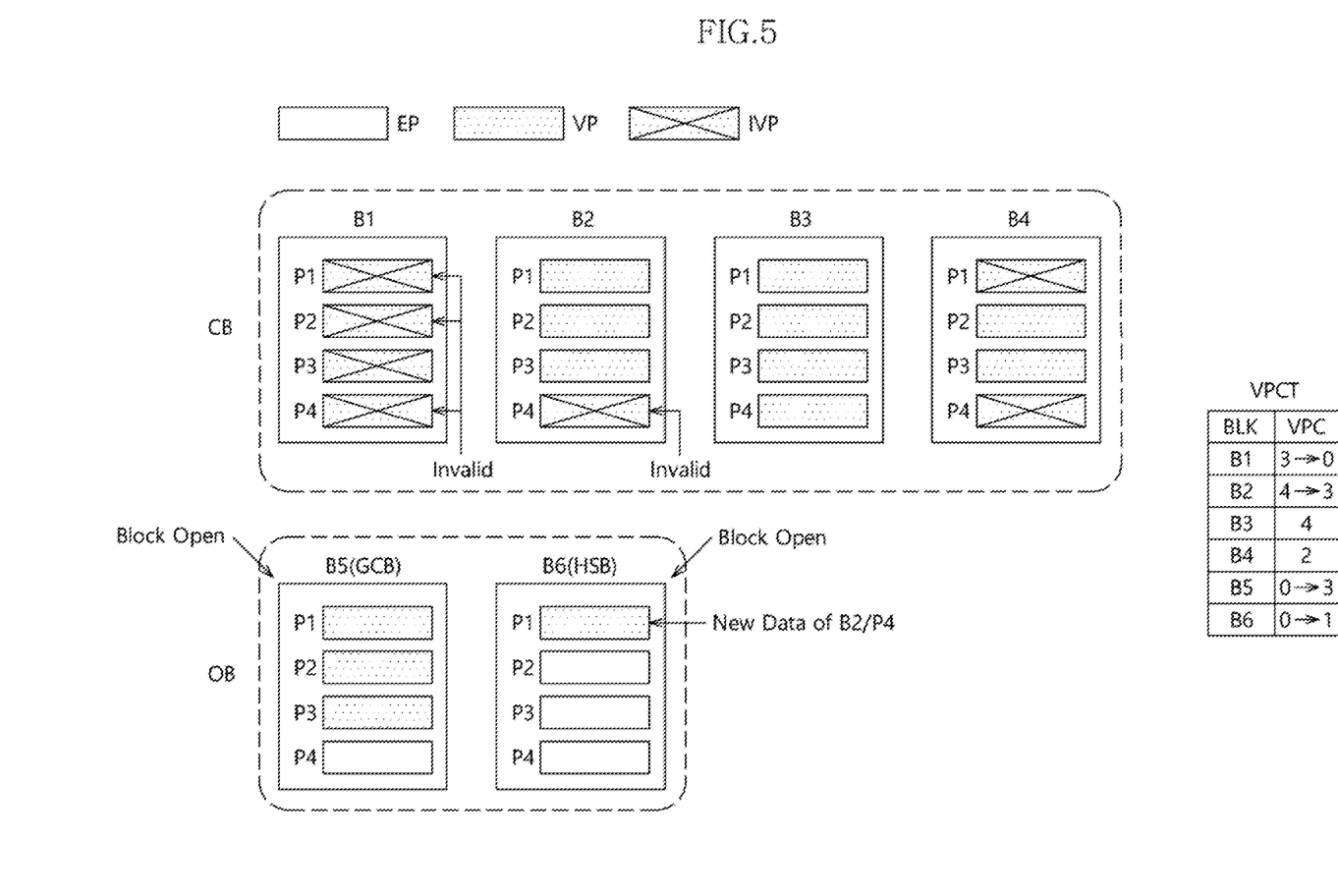
FIG. 5 is a diagram illustrating an update of a valid page count table in accordance with an embodiment of the present invention.

FIG. 5 is a diagram illustrating update of a valid page count table VPCT in accordance with an embodiment of the present invention. The valid page count table VPCT may be updated for various reasons. For instance, descriptions will be made for a case where the valid page count table VPCT described above with reference to FIG. 4 is updated when a garbage collection operation is performed and then a write request is issued from the host device.

In the following descriptions, when any one among the empty memory blocks in which no data is stored is selected for storing data, this operation will be referred to as opening the empty memory block or that the empty memory block is opened or allocated to store data. After the memory block is opened the memory block will be referred to as an open memory block.

If the garbage collection operation is performed for the first memory block B1 which is selected as a garbage collection target block, the fifth memory block B5 may be opened as a garbage collection block GCB to collect valid data. Then, the valid pages P1, P2 and P4 of the first memory block B1 may be respectively copied to the first to third pages P1 to P3 of the fifth memory block B5, and then be changed to invalid pages. In this case, the valid page count VPC of a garbage collection target block may be updated. For example, the valid page count VPC of the first memory block B1 may be changed to "0" from "3." Also, the valid page count VPC of a newly opened block OB may be updated depending on the number of valid pages. For example, the valid page count VPC of the fifth memory block B5 may be changed to "3" from "0" and the valid page count VPC of the sixth memory block B6 may be changed to "1" from "0."

If the host device requests to update the data stored in the fourth page P4 of the second memory block B2 with new data, due to the previously discussed limitation in overwriting existing data, the sixth memory block B6 may be opened as a host write block HSB to store the new data. Then, the new data may be stored in the first page P1 of the sixth memory block B6, and the fourth page P4 of the second memory block B2 may be changed to an invalid page. In this case, the valid page count VPC of a block in which an invalid page occurs may be updated depending on the number of invalidated pages. For example, the valid page count VPC of the second memory block B2 may be changed to "3" from "4." Also, the valid page count VPC of an open block may be updated depending on the number of valid pages. For example, the valid page count VPC of the sixth memory block B6 may be changed to "1" from "0."

Figure 6:
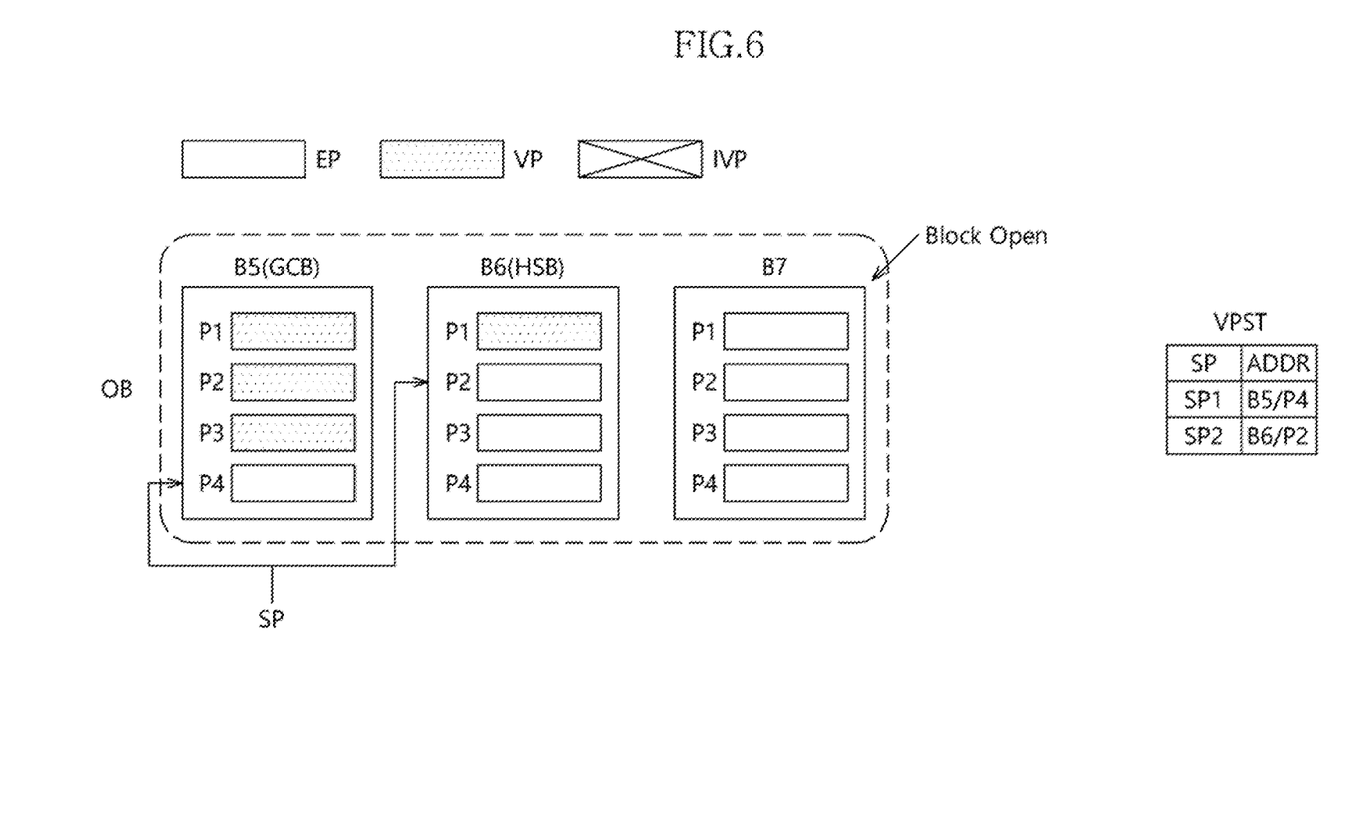
FIG. 6 is a diagram illustrating a valid page scan table in accordance with an embodiment of the present invention.

FIG. 6 is a diagram illustrating a valid page scan table VPST in accordance with an embodiment of the present invention. The valid page scan table VPST managed by the valid page management module VPM of FIG. 2 may be defined as a table comprising information on the positions where a valid page scan operation is to be performed, hereinafter, referred to as scan pointer SP. A scan pointer SP may indicate the address of an empty page of a memory block which is already opened. In detail, the scan pointer SP may indicate the address of a page next to a page which is lastly stored with data, that is, the address of a page with a fastest program order among empty pages.

The valid page management module VPM may generate or update the valid page scan table VPST each time a memory block is newly opened. For example, if the host write block HSB is newly opened with the garbage collection block GCB opened, the valid page management module VPM may generate or update the valid page scan table VPST. For another example, if the garbage collection block GCB is opened with the host write block HSB opened, the valid page management module VPM may generate or update the valid page scan table VPST.

If a memory block is newly opened with the valid page scan table VPST not generated, the valid page management module VPM may generate the valid page scan table VPST. Further, if a memory block is newly opened with the valid page scan table VPST generated already, the valid page management module VPM may update the valid page scan table VPST such that a new scan pointer is reflected.

When a metadata backup event occurs, the valid page management module VPM may back up the valid page scan table VPST loaded in the random access memory 220, in the meta block MB.

For instance, a valid page scan table VPST for the newly opened blocks B5 and B6 described above with reference to FIG. 5 will be described. Referring to FIG. 6, if the seventh memory block B7 is opened to perform the garbage collection operation or process a write request of the host device for updating user data, a first scan pointer SP1 may indicate the address of the fourth page P4 (that is, a page to be programmed next according to a program sequence) of the fifth memory block B5 which is already opened. Moreover, a second scan pointer SP2 may indicate the address of the second page P2 (that is, a page with a fastest program order among empty pages) of the sixth memory block B6 which is already opened.

Figure 7:
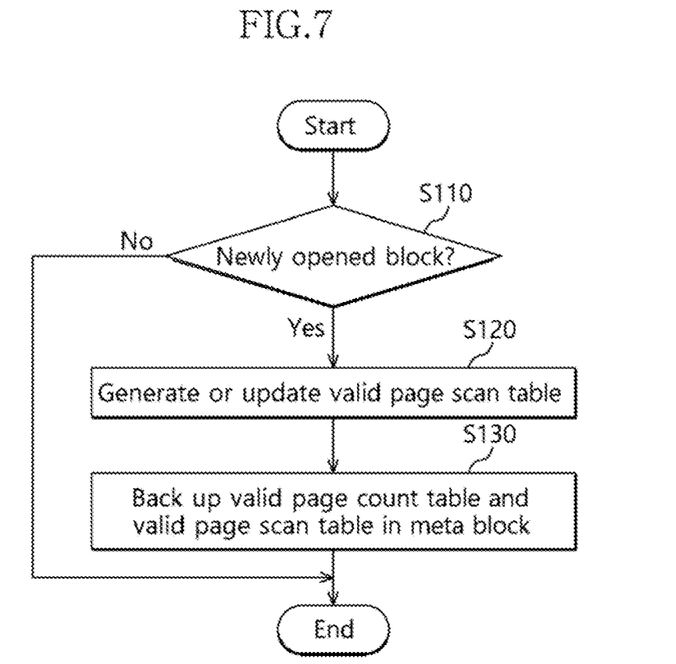
FIG. 7 is a flow chart illustrating a backup operation for a valid page count table and a valid page scan table in accordance with an embodiment of the present invention.

FIG. 7 is a flow chart illustrating a backup operation for a valid page count table and a valid page scan table in accordance with an embodiment of the present invention. With reference to FIG. 7, the operation of the valid page management module VPM which is driven by the control unit 210 of FIG. 1 will be described.

At step S110, whether a newly opened block has been generated may be determined. For example, whether a memory block is newly opened in addition to an already opened memory block may be determined. In the case where a newly opened block has not been generated, the process may be ended.

At step S120, as described above with reference to FIG. 6, in the case where a newly opened block has been generated, the valid page scan table VPST may be generated or updated.

At step S130, the valid page count table VPCT (e.g., FIGS. 4 and 5) and the valid page scan table VPST (e.g., FIG. 6) may be backed up in a meta block (e.g., MB of the memory cell array 310 in FIG. 3). That is to say, by considering, as a backup event, whether a newly opened block has been generated, the valid page count table VPCT and the valid page scan table VPST which are loaded in the random access memory 220 may be backed up in a meta block MB.

Figure 8:
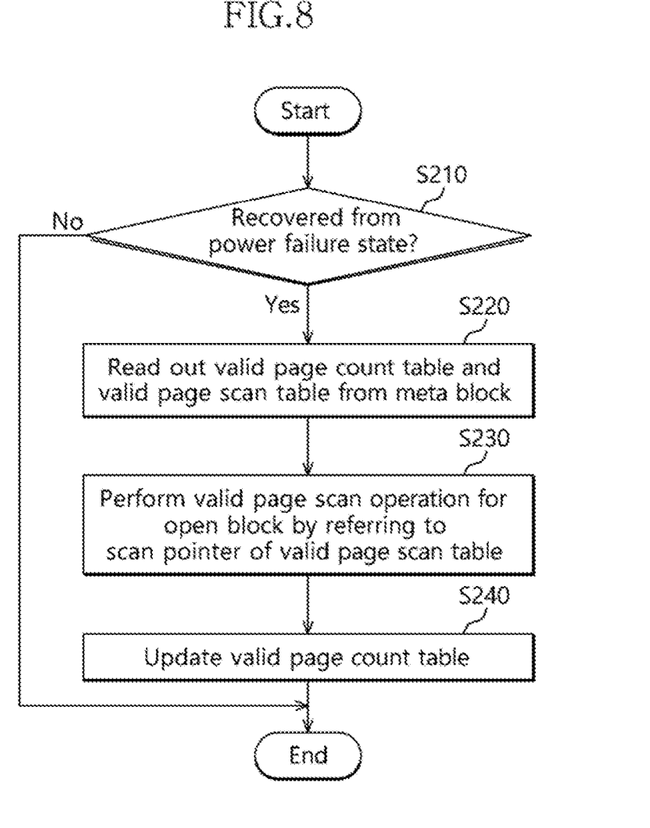
FIG. 8 is a flow chart illustrating a recovery operation of a data storage device from a power failure state in accordance with an embodiment of the present invention.

FIG. 8 is a flow chart illustrating an operation of a data storage device recovered from a power failure state in accordance with an embodiment of the present invention. With reference to FIG. 8, the operation of the control unit 210 of FIG. 1 which rebuilds the valid page count table VPCT when a recovery is made from a power failure state will be described.

At step S210, whether a recovery is made from a power failure state may be determined. In the case where a recovery is not made from a power failure state, the process may be ended.

At step S220, the valid page count table VPCT (e.g., FIGS. 4 and 5) and the valid page scan table VPST (e.g., FIG. 6) may be read out from a meta block (e.g., MB of the memory cell array 310 in FIG. 3). For example, the valid page count table VPCT and the valid page scan table VPST which are backed up in the meta block at the step S130 of FIG. 7 may be read out.

At step S230, the valid page scan operation for an open block may be performed by referring to a scan pointer SP of the valid page scan table VPST (e.g., FIG. 6). For example, valid pages of an open block OB may be scanned from a scan pointer SP, and the number of valid pages of the open block OB may be newly counted.

At step S240, the valid page count table VPCT may be updated (e.g., FIG. 6). In other words, the number of valid pages of the open block OB which is updated at the step S230 may be reflected on the valid page count table VPCT. For example, the valid page count of the open block OB may be increased depending on the number of valid pages of the open block OB which is counted at the step S230, and the valid page count of a closed block CB may be decreased depending on the number of invalid pages of the closed block CB corresponding to the valid pages of the open block OB.

Figure 9:
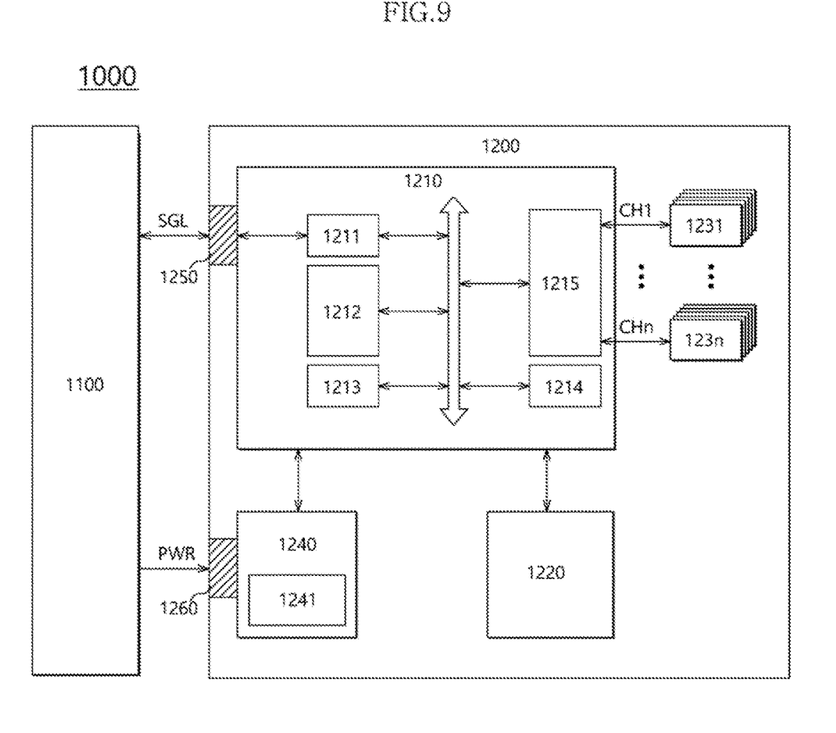
FIG. 9 is a diagram illustrating a data processing system including a solid state drive in accordance with an embodiment of the present invention.

FIG. 9 is a diagram illustrating a data processing system 1000 including a solid state drive (SSD) in accordance with an embodiment of the present invention. Referring to FIG. 9, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215 operatively coupled via an internal bus.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-e) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The ECC unit 1214 may generate parity data which are transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn. One or more nonvolatile memory devices may be coupled to each channel. Nonvolatile memory devices coupled to the same channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 10:
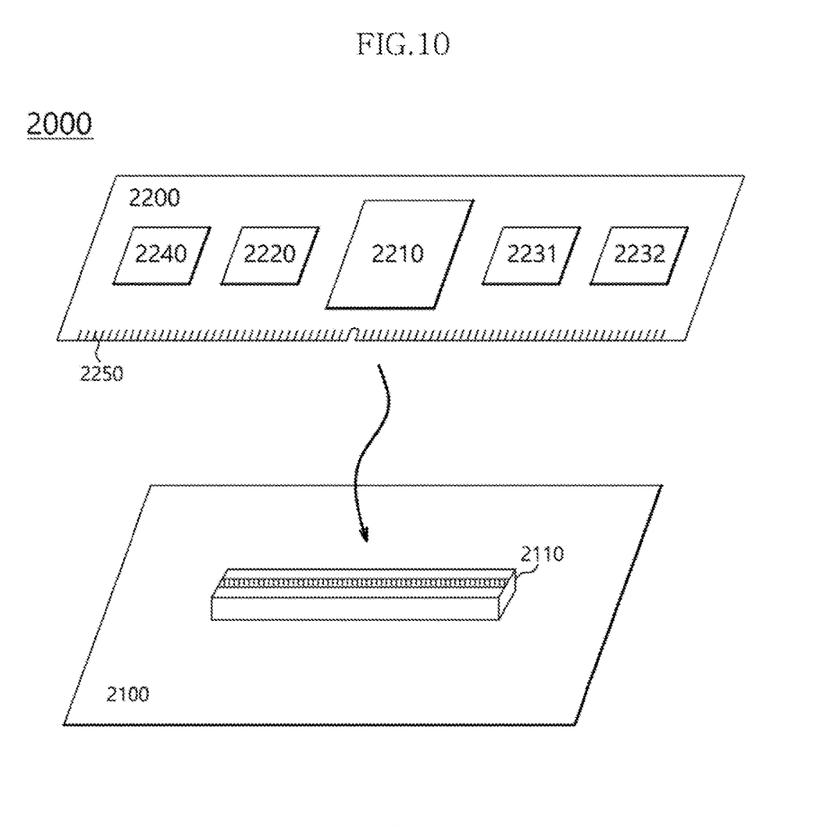
FIG. 10 is a diagram illustrating a data processing system including a data storage device in accordance with an embodiment of the present invention.

FIG. 10 is a diagram illustrating a data processing system 2000 including a data storage device 2200 in accordance with an embodiment of the present invention. Referring to FIG. 10, the data processing system 2000 may include a host device 2100 and the data storage device 2200.

The host device 2100 may be configured in the form of a board such as a printed circuit board. Although not shown, the host device 2100 may include internal function blocks for performing the functions of a host device.

The host device 2100 may include a connection terminal 2110 such as a socket, a slot or a connector. The data storage device 2200 may be operatively coupled to the host 2100 by being mounted to the connection terminal 2110. The data storage 2200 device may be removably mounted to the connection terminal 2110.

The data storage device 2200 may be configured in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be configured in the same manner as the controller 1210 shown in FIG. 9.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the data storage device 2200.

The PMIC 2240 may provide the power inputted through the connection terminal 2250, to the inside of the data storage device 2200. The PMIC 2240 may manage the power of the data storage device 2200 under the control of the controller 2210.

The connection terminal 2250 may be coupled, for example, removably coupled to the connection terminal 2110 of the host device 2100. Through the connection terminal 2250, signals such as commands, addresses, data and so forth and power may be transferred between the host device 2100 and the data storage device 2200. The connection terminal 2250 may be configured into various types depending on an interface scheme between the host device 2100 and the data storage device 2200. The connection terminal 2250 may be disposed on any one side of the data storage device 2200.

Figure 11:
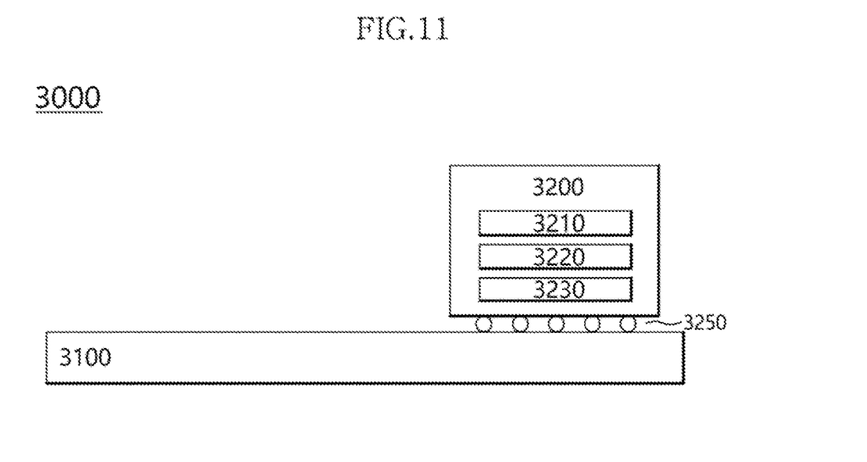
FIG. 11 is a diagram illustrating a data processing system including a data storage device in accordance with an embodiment of the present invention.

FIG. 11 is a diagram illustrating a data processing system 3000 including a data storage device 3200 in accordance with an embodiment of the present invention. Referring to FIG. 11, the data processing system 3000 may include a host device 3100 and the data storage device 3200.

The host device 3100 may be configured in the form of a board such as a printed circuit board. Although not shown, the host device 3100 may include internal function blocks for performing the functions of a host device.

The data storage device 3200 may be configured in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 9.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the data storage device 3200.

Figure 12:
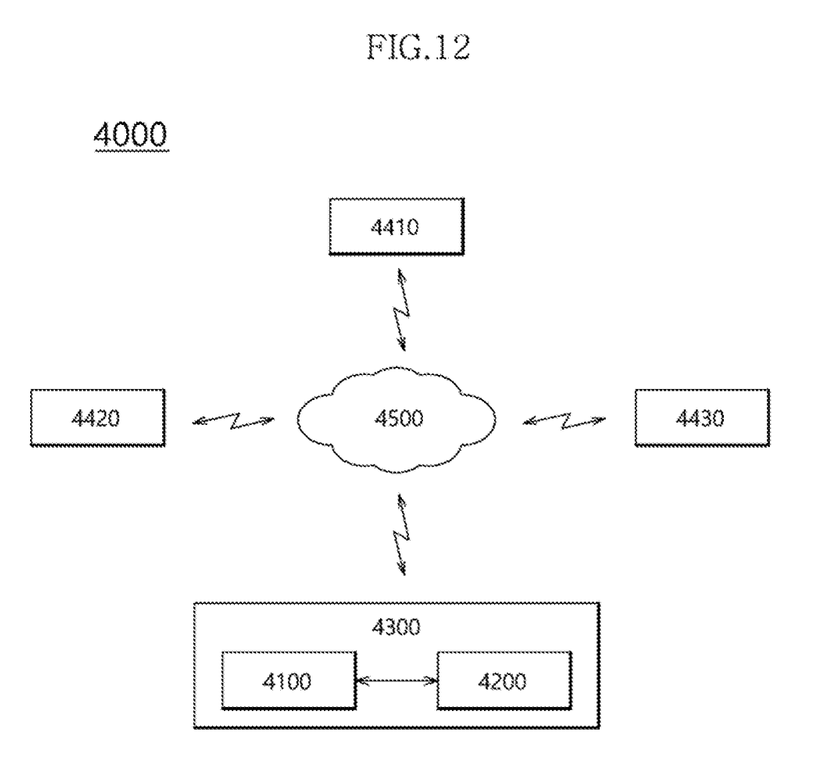
FIG. 12 is a diagram illustrating a network system including a data storage device in accordance with an embodiment of the present invention.

FIG. 12 is a diagram illustrating a network system 4000 including a data storage device in accordance with an embodiment of the present invention. Referring to FIG. 12, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and a data storage device 4200. The data storage device 4200 may be configured by the data storage device 100 shown in FIG. 1, the data storage device 1200 shown in FIG. 9, the data storage device 2200 shown in FIG. 10 or the data storage device 3200 shown in FIG. 11.

Figure 13:
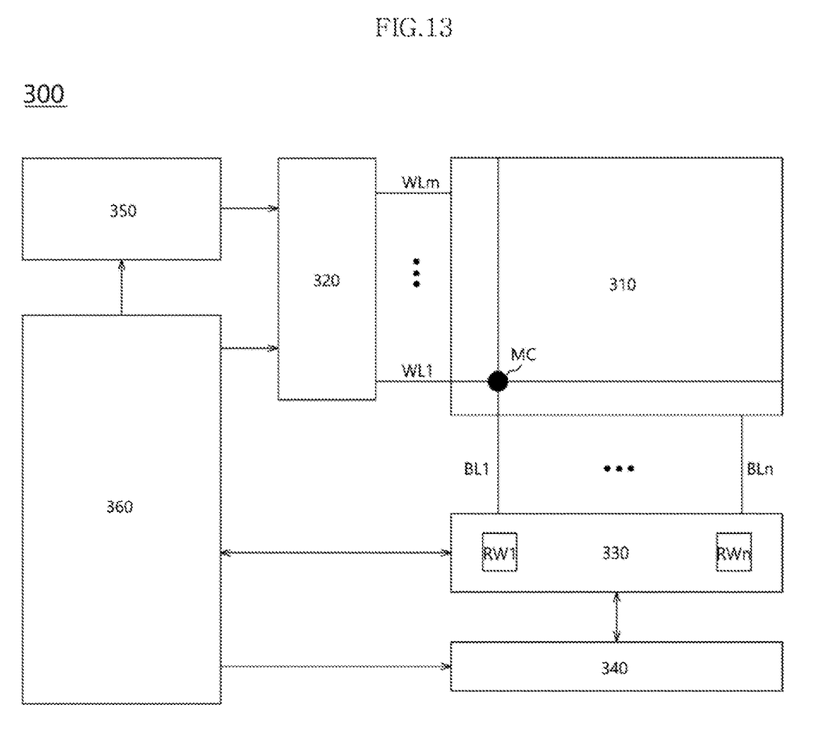
FIG. 13 is a block diagram illustrating a nonvolatile memory device included in a data storage device in accordance with an embodiment of the present invention.

FIG. 13 is a block diagram illustrating a nonvolatile memory device included in a data storage device 300 in accordance with an embodiment of the present invention. Referring to FIG. 13, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines (or data input/output buffers), based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the data storage device and the operating method thereof described herein should not be limited based on the described embodiments.

What is claimed is:

1. A method for operating a data storage device which includes a nonvolatile memory device including a plurality of memory blocks, the method comprising: generating a valid page count table including a number of valid pages of each of closed blocks among the plurality of memory blocks in which data are written in ail pages thereof and the number of valid pages of at least one open block among the plurality of so memory blocks in which data is written in a part of pages thereof; generating a valid page scan table including a scan pointer for scanning the number of valid pages of the open block; and backing up the valid page count table and the valid page scan table in a meta block among the plurality of memory blocks.

2. The method according to claim 1, wherein generating of the valid page scan table comprises generating the valid page scan table, when a memory block among the plurality of memory blocks is newly opened.

3. The method according to claim 1, wherein the scan pointer indicates an address of an empty page of the open block.

4. The method according to claim 1, wherein the scan pointer indicates a page address with a fastest program order among empty pages of the open block.

5. The method according to claim 1, wherein backing up of the valid page count table and the valid page scan table comprises backing up the valid page count table and the valid page scan table when a memory block is newly opened to perform a garbage collection operation for any one among the closed blocks.

6. The method according to claim 1, wherein backing up of the valid page count table and the valid page scan table comprises backing up the valid page count table and the valid page scan table when a memory block is newly opened to process a write request of a host device for updating data stored in the closed blocks with new data.

7. The method according to claim 1, further comprising:
reading out the valid page count table and the valid page scan table from the meta block when a recovery is made from a power failure state.

8. The method according to claim 7, further comprising:
scanning the number of valid pages of the open block from the scan pointer of the valid page scan table.

9. The method according to claim 8, further comprising:
updating the valid page count table depending on the number of the valid pages of the open block which are scanned from the scan pointer.

10. A data storage device comprising: a nonvolatile memory device including empty blocks which are not stored with data, closed blocks in which data are stored in ail pages, at least one open block in which data is stored in only a part of pages, and a meta block; and a controller suitable for: generating a valid page count table based on a number of valid pages of the respective closed blocks and the number of valid pages of the open blocks; generating a valid page scan table based on a scan pointer is which indicates an address of an empty page of the open block; and backing up the valid page count table and the valid page scan table in a meta block.

11. The data storage device according to claim 10, wherein the controller generates the valid page scan table when any one among the empty blocks become an open block.

12. The data storage device according to claim 10, wherein the scan pointer indicates a page address with a fastest program order among empty pages of the open block.

13. The data storage device according to claim 10, wherein a open memory block is a garbage collection memory block to which at least one valid page of any one of the dosed blocks is copied, and wherein the controller backs up the valid page count table and the valid page scan table when any one among the empty docks is opened to process a write request of a host device.

14. The data storage device according to claim 10,
wherein the open memory block is a host write block which is to be stored with data for updating the data stored in the closed blocks, and
wherein the controller backs up the valid page count table and the valid page scan table when any one among the empty blocks is opened to perform a garbage collection operation.

15. The data storage device according to claim 10, wherein the controller reads out the valid page count table and the valid page scan table from the meta block when a recovery is made from a power failure state.

16. The data storage device according to claim 15, wherein the controller scans the number of valid pages of the opened block from the scan pointer.

17. The data storage device according to claim 16, wherein the controller updates the valid page count table depending on the number of the valid pages of the opened block which are scanned from the scan pointer.

18. The data storage device according to claim 17, wherein the controller increases a valid page count of the open block depending on the number of valid pages of the open block, and decreases a valid page count of a closed block depending on the number of invalid pages of the closed block corresponding to the valid pages of the open block.

* * * * *